United States Patent Office 2,936,266
Patented May 10, 1960

2,936,266

PRODUCTION OF ERGOT ALKALOIDS

Siegfried Windisch, Berlin-Hermsdorf, and Walther Bronn, Berlin, Germany, assignors to Versuchs- u. Lehranstalt für Spiritusfabrikation, Berlin, Germany No Drawing. Application February 24, 1956
Serial No. 567,474

Claims priority, application Germany March 3, 1955

17 Claims. (Cl. 195—81)

The present invention relates to a method of biosynthetically producing ergot (*Claviceps purpurea* and other species of the genus Claviceps) alkaloids in saprophytic cultures of ergot in nutrient media.

For many years attempts have been made to cultivate ergot saprophytically in an artificial nutrient medium. The establishment of such cultures created no significant difficulties but the fungus could not be induced to produce the valuable alkaloids under artificial conditions. Although G. Schweitzer, phytopathol. Z., 13; 317 (1941), claimed, in saprophytic cultivation, to have obtained a sclerotial form similar to the sclerotia developed by the fungus in natural growth and to have found an alkaloid content equal to that of the commercially available product, these results could not be confirmed by other investigators who later repeated the tests. In this connection reference is made to the following papers: H. D. Michener and N. Snell, Americ. Journ. Botany, 37, 52 (1950), S. K. Sim and H. W. Youngken, J. Amer. Pharm. Assoc., Sci. Ed., 40, 434 (1951), and V. E. Tyler, and A. E. Schwarting, ibid., 41, 590 (1952). In view of this fact the investigation of ergot has, for many years, been largely confined to the parasitic culturing of the fungus.

Many years were spent by the present inventors in investigating the nutritional requirements and the metabolism of a large number of saprophytically cultivated Claviceps spec. of European and extra-European origin and they were successful at last in finding cultural conditions in which the biosynthesis of alkaloids was induced to occur. Basically, it was found that these fungi never form alkaloids when the conditions of cultivation permit intensive cellular respiration. During the period of growth, that is to say during the period of active cell multiplication, cellular respiration is very intense. Respiration is necessary for cell division to take place at all. Similarly, autolysis of the cells of the fungus at the end of the period of growth is coupled with pronounced respiration so that in the course of development of a normal culture, which includes cellular growth and autolysis, no alkaloids can be formed and accumulated. To promote the biosythesis and the accumulation of alkaloids, the prerequisite condition is for respiration of the cells of the fungus to be severely suppressed by measures calculated to maintain the respiratory metabolism of the cells in a state of quiescence.

It is therefore proposed according to the present invention to cultivate Claviceps spec. saprophytically in nutrient subtrates which contain assimilable sources of carbon, nitrogen, as well as of essential mineral salts, the cultivation being conducted at low pH values, preferably between pH 3.0 and 5.0, and under aerobic conditions, and then, for the purpose of inducing the production of alkaloids, to maintain the cell growth of the fungus in a static condition of pH-values between approximately 5.5 and 7.0 in an environment wherein respiration is largely suppressed. According to the invention, the reduction in the rate of respiration is achieved either by producing anaerobic conditions at rH values of the substrate equal to 18 or less, or by creating an artificial nutrient deficiency, or by using specific toxic inhibitors of cellular respiration. The two latter methods bring about a reduction in respiratory activity even in aerobic conditions.

Further features of the present invention will emerge in the course of the following particularised description of the method herein proposed.

A large number of samples of ergot of different origin of the species *Claviceps purp.* Tul. and other species of the genus Claviceps were examined and their alkaloid content as well as the composition of the alkaloids determined. Pure cultures were grown on saccharose-peptone-mineral salt-agar by the well-known method of isolating pseudo-parenchymatous tissue from inside the sclerotia. It is important to segregate the species and strains, before cultivation, according to the type and quantity of the alkaloids in the sclerotia because some strains are found to contain only traces of alkaloids and these latter fail to produce them even in the conditions that have been described. Consequently, only selected strains with satisfactory alkaloid forming potential are suitable for the production of alkaloids in saprophytic cultivation.

GROWTH CONDITIONS FOR CLAVICEPS SPEC.

These are similar to those required for growing most moulds. For the purpose of synthesising the purely cellular tissues an assimilable organic source of carbon, a similarly assimilable organic or inorganic source of nitrogen, and certain mineral salts are required. The examined strains did not depend upon the presence of special growth factors although such additions had an accelerating effect. In regard to cultural methods, both surface and submerged cultures can be used in a similar way to the manner in which moulds are grown.

Assimilable carbon sources are arabinose, xylose, glucose, fructose, galactose, mannose, saccharose, dextrine, starch, mannite, fatty oils (such as olive oil) and the intermediate acids of glycolysis and of the tricarboxylic acid series, preferably glucose, fructose, and mannite. Lactose could not be utilised by any of the strains that were examined.

Assimilable nitrogen sources readily utilised by all the tested strains were peptone, hydrolysed casein, yeast extract, glutamic acid, asparagine, glycocoll, leucine, dl-alanine, guanidine and urea. Ammonium salts and nitrates were likewise easily assimilated but measures had to be taken to prevent the ammonium salt anions and the nitrate cations from impairing the growth of the fungus. When feeding sulphate of ammonium, for instance, the progressive assimilation of nitrogen by the fungus releases an equivalent quantity of sulphuric acid which gradually retards growth and finally inhibits it altogether. When using alkali nitrates, a corresponding process of alkalinisation occurs. Ammonium nitrate acidifies because the ammonium ions are assimilated first. However, if when using nitrates or ammonium salts the substrate is continually neutralised, the fungus takes advantage of these sources of nitrogen as readily as when organic sources of nitrogen are available. Essential mineral salts are phosphates, magnesium, iron, and a few trace elements. The following mineral salt concentrations were found to be both suitable and sufficient to promote optimum growth: $KH_2PO_4$ 500–100 mg. percent, $MgSO_4 \cdot 7H_2O$ 100 mg. percent, $FeSO_4 \cdot 7H_2O$ 10 mg. percent, $ZnSO_4 \cdot 7H_2O$ 1 mg. percent, $CuSO_4 \cdot 5H_2O$ gamma percent, $(NH_4)_6Mo_7O_{24} \cdot 4H_2O$ 5 gamma percent, $MnSO_4 \cdot 5H_2O$ 8 gamma percent, $H_3BO_3$ 2 gamma percent. The mineral content of tap water used for preparing the substrate is generally adequate to satisfy the demand for trace elements, so that nothing more is required than an addition of phosphate and magnesium salt.

Growth factors are not essential but an addition of organ or vegetable extracts, such as malt extract, yeast extract, and the like, slightly accelerates growth. The best culture temperature is 25° to 30° C., and optimum hydrogen ion concentration (pH) in the substrate for promoting growth lies between pH 3.5 and 5.0. Optimum redox potential (rH) of the substrate for growth promotion is at least rH 24 and higher. In surface cultivation, this may be obtained by using maximum obtainable surface area of the culture medium, in shaker flasks, by using a sufficiently high frequency of shaking and by filling the flask with not more than ¼ of its volume with substrate, and when effecting deep cultivation in fermenters by stirring and vigorous aeration.

RELATIONSHIP BETWEEN GROWTH AND NUTRIENT CONCENTRATION

For optimum growth both the absolute and relative quantities of the nutrients must be available in certain minimum amounts. The limiting proportions are approximately carbon:nitrogen:phosphate as 40:1:1. In aerobic conditions, the synthesis of carbon into cellular substance then reaches optimum values. If the relative quantity of nitrogen or phosphorus is increased or the relative carbon quantity lowered, incorporation of the latter into the cellular structure continues at optimum values. The efficiency of carbon assimilation does not therefore change very appreciably. However, this does not apply if the relative carbon quantity is considerably increased for instance by using a proportion of 100:1:1, or if there is a considerable deficiency of both nitrogen and phosphorus. The efficiency of carbon utilisation as well as the speed of assimilation falls off at once. At the same time, the composition of the mycelium undergoes a change. There is considerable storage of fats in the cells and simultaneously respiration begins to be strongly reduced. With reference to the absolute quantities of nutrients, the general rule appears to be that in surface cultivation the carbon concentration required for optimum cellular synthesis must not exceed 4%. This is equivalent to 10% glucose. In submerged cultivation, the maximum is about 1.2% carbon which corresponds with 3% glucose. Higher concentrations lead to overcrowded conditions of growth.

CONDITIONS FOR ALKALOID SYNTHESIS

The production of alkaloids in saprophytic cultivation of Claviceps spec. is confined to selected strains with pronounced alkaloid-forming ability. The fundamental requirement for the accumulation of alkaloids in such cultures is the restriction of the intensity of cellular respiration and, at the same time, the maintenance of a pH-value in the substrate of between 5.5 and 7.0. Since these conditions preclude growth and the quantity of alkaloid formed depends upon the volume of the available fungal material, cellular respiration must not be impeded for the purpose of alkaloid formation until the culture has first been allowed to pass through a growth phase. Both phases can be so controlled that one merges into the other, or alternatively, they may be conducted in two separate cultural stages. The means of restricting cellular respiration comprise either the imposition of anaerobic conditions, or the creation of a deficient nutritive environment, or the addition of specific respiratory toxins. The addition of indole or of its derivatives, such as indoleacetic acid and tryptophane, is not essential but it does increase the alkaloid yield.

ALKALOID PRODUCTION BY INHIBITION OF RESPIRATION IN ANAEROBIC CONDITIONS

The necessary reduction in the rate of respiration that is required for the production of alkaloids was achieved by successive or sudden reductions in the redox potential of the substrate to rH values of about 18 or less. To this end, well-known reducing agents such as ascorbic acid, sulphite, hydroquinone, organ extracts, were added to the substrate, and/or atmospheric oxygen was prevented from coming into contact with the cultures.

EXAMPLES

The methods hereinafter described were carried out with a Claviceps strain derived from a sclerotium isolated on *Lolium perenne*.

Example I.—Surface culture

A 200 ml. Erlenmeyer flask containing 50 ml. substrate, temperature 30° C.

Substrate:
 10% saccharose
 1% hydrolysed casein
 0.4% $KH_2PO_4$
 0.1% $MgSO_4 \cdot 7H_2O$
 0.01% $FeSO_4 \cdot 7H_2O$
 Plus trace elements
 Plus malt extract After 14 days, the mats of mycelium were transferred to sterile media of the following composition:

A. 0.5% peptone (cont. trypt.)
 0.1% sodium ascorbate
 Phosphate cake (Sörensen) pH 7.0
 50 ml. in 100 ml. Erlenmeyer flask.

B. 0.05% tryptophane
 0.1% sodium ascorbate
 Phosphate cake (Sörensen) pH 7.0
 50 ml. in 100 ml. Erlenmeyer flask.

The flasks were provided with airtight seals and incubated at 30° C.

Determination of alkaloids after 10 days (calculated on the basis of ergotamine):

A. 18 mg. percent total alkaloids in the substrate,
 12 mg. percent total alkaloids in the mycelium.

B. 27 mg. percent total alkaloids in the substrate,
 16 mg. percent total alkaloids in the mycelium.

Example II.—Culture in a shaking flask

A 500 ml. Erlenmeyer flask was charged with 100 ml. of substrate and maintained at a temperature of 28° C., the shaker frequency being 120/min.

Substrate:
 2.5% saccharose
 1.0% hydrolysed casein
 0.4% $KH_2PO_4$
 0.1% $MgSO_4 \cdot 7H_2O$
 0.01% $FeSO_4 \cdot 7H_2O$
 Plus trace elements.

At the end of six days, the substrate was adjusted to a pH of 6.5 by the addition of a sterilised solution of KOH and repeatedly re-adjusted during the following days. At the same time, 0.1% of sodium ascorbate was added to reduce the rH value, as well as 0.05% of tryptophane. The flasks were sealed and continuously shaken.

Alkaloid determination after varying incubation periods adduced the following results (calculated on the basis of ergotamine):

After 48 hours—
 5.3 mg. percent total alkaloids in the mycelium,
 4.1 mg. percent total alkaloids in the substrate.

After 72 hours—
 6.4 mg. percent total alkaloids in the mycelium,
 9.7 mg. percent total alkaloids in the substrate.

After 96 hours—
 6.6 mg. percent total alkaloids in the mycelium,
 10.4 mg. percent total alkaloids in the substrate.

PRODUCTION OF ALKALOIDS WHEN INHIBITING RESPIRATION BY THE CREATION OF A NUTRIENT DEFICIENCY

A number of research workers have pointed out that the cells of various micro-organisms appear to enter a rest stage in regard to their respiratory metabolism after they have stored considerable reserves of fats and carbohydrates. This was discovered for instance in the case of yeast by C. C. Lindgren, Arch. Biochem., 8, 119 (1945). Culture methods which lead to an accumulation of fats and carbohydrates in the cells of many micro-organisms are to-day widely known. Nearly all these methods rely on creating deficiencies in assimilable nitrogen, phosphate, or sulphate in the nourishment of the organisms, whilst at the same time maintaining adequate supplies of carbohydrates. Among the many papers which have been published on this subject it will be sufficient to refer to general surveys published by F. F. Nord, Advances Enzymol., 9, 653 (1949); A. Kleinzeller, Advances Enzymol., 8, 299 (1948), and K. Bernauer, Erg. Enzymforsch., 9, 297 (1943). That the metabolism of claviceps spec. similarly undergoes a change to adjust itself to deficiency conditions is for the first time disclosed by the inventors. Experiments show that from a certain threshold value downwards increasing deficiencies of nitrogen, phosphate, or sulphate, in the substrate lead to a continuous reduction in the turnover of carbohydrates, a decrease in utilisation efficiency, as well as a decrease in the protein content of the cells, whereas the storage of fats and carbohydrates is stimulated. As a result, the intensity of respiration diminishes in proportion. Since respiration was recognised to be the limiting factor in the biosynthesis of alkaloids by ergot, it is proposed to exploit the method of creating a nutrient deficiency for the purpose of inducing the manufacture of alkaloids by the fungus. The transition from the growth phase (intensive respiration) to the alkaloid forming phase (severely reduced respiration) may be continuous. By taking suitable measures the process can, of course, be discontinuously conducted in two separate stages, for instance by transferring normally-grown mycelium to a substrate in which the nutrient elements are present in the extreme proportions that create deficiency conditions.

The features of this method according to the present invention will be more particularly hereinafter described.

NITROGEN DEFICIENCY

Nitrogen is deficient in the nutrient substrate for cultivating Claviceps spec. if the relative quantities of nitrogen and carbon (N/C) are considerably reduced to ratios less than 1:40 in surface cultures and 1:25 in submerged cultures. The figures given represent approximate limiting ratios in which the available nitrogen in the substrate is just sufficient to support normal growth of the fungus and the cells will show optimum protein content coupled with minimum storage of fat as well as optimum respiration under aerobic conditions. If the carbon concentration in the substrate is raised or the nitrogen concentration lowered, that is to say, if the ratio of N/C is reduced, the symptoms of nitrogen deficiency will forthwith appear. These consist in a reduction in the rate of metabolism, a reduction in the utilisation efficiency, a decrease in the protein content of the cells, a diminution in the rate of cellular respiration, and a concomitant increase in the storage of fats and carbohydrates within the cells, and in the synthesis of alkaloids. Metabolism continuously changes until the most extreme N/C conditions are reached. However, in practice there is little advantage in creating very extreme conditions because, as has been explained, the rate of metabolism is concurrently reduced. Moreover, cell multiplication practically ceases under extreme N/C conditions in view of the fact that the cells need a minimum nitrogen content amounting to about 2.5% N (by dry weight), and that a certain quantity of nitrogen is also required for the biosynthesis of alkaloids. Experiments with various strains of ergot have shown that N/C ratios between about 1:70 and 1:100 constitute optimum conditions for the formation of alkaloids.

Example III

Culture of a Claviceps spec. strain (from a sclerotium isolated on Elymus mollis) at 27° C. in an Erlenmeyer flask on 100 ml. substrate in surface culture.

| Substrate A | Substrate B |
|---|---|
| N/C=1:16 | N/C=1:80 |
| 8.00% saccharose. | 8.00% saccharose. |
| 0.43% urea. | 0.086% urea. |
| 0.20% $KH_2PO_4$. | 0.20% $KH_2PO_4$. |
| 0.10% $MgSO_4 \cdot 7H_2O$. | 0.10% $MgSO_4 \cdot 7H_2O$. |
| plus trace elements. | plus trace elements. |

The results are shown in Tables 1 and 2.

TABLE 1 (SUBSTRATE A)

| Culture period, days | Dry weight of mycelium, g./100 ml. | Residual sugar in substrate, g./100 ml. | Fat content of mycelium, percent | Total alkaloid yield in mycelium and substrate in mg./flask (as ergometrine) |
|---|---|---|---|---|
| 10 | 1.18 | 4.42 | 5.7 | 0 |
| 14 | 2.03 | 1.83 | 5.1 | 0 |
| 18 | 2.56 | 0.04 | 4.7 | 0 |
| 22 | 2.30 | 0 | 2.8 | 0 |
| 26 | 1.66 | 0 | 2.1 | 0 |

TABLE 2 (SUBSTRATE B)

| Culture period, days | Dry weight of mycelium, g./100 ml. | Residual sugar in substrate, g./100 ml. | Fat content of mycelium, percent | Total alkaloid yield in mycelium and substrate in mg./flask (as ergometrine) |
|---|---|---|---|---|
| 10 | 0.59 | 5.83 | 9.8 | 0 |
| 14 | 1.01 | 4.06 | 14.3 | 0 |
| 18 | 1.26 | 2.72 | 18.9 | traces |
| 22 | 1.42 | 1.68 | 21.2 | 0.4 |
| 26 | 1.51 | 1.13 | 23.8 | 3.6 |
| 28 | 1.58 | 0.82 | 26.2 | 1.8 |
| 32 | 1.50 | 0.59 | 25.1 | 19.1 |

Corresponding submerged cultures produce substantially similar results but the alkaloid yields are rather less.

PHOSPHATE DEFICIENCY

The limiting ratio of phosphate and carbon which offers just enough phosphate for a saturated nutrition of ergot is approximately $PO_4/C = 1:80$ to $1:100$, provided other nutrients are available in adequate quantities. As soon as the phosphates are reduced to smaller proportions similar symptomatic changes in metabolism as occur when nitrogen is deficient at once become apparent. With regard to the production of alkaloids phosphate deficiency adduces more favourable results than the nitrogen deficiency method. Again, an excessive deficiency of phosphate is not an advantage. The optimum ratio for alkaloid synthesis was found to be $PO_4/C$ approximately equal to 1:200 to 1:280.

Example IV

Strain and external conditions of culture similar to previous example.

| Substrate A | Substrate B |
|---|---|
| $PO_4/C = 1:29$ | $PO_4/C = 1:235$ |
| 5.00% glucose. | 5.00% glucose. |
| 0.43% urea. | 0.43% urea. |
| 0.10% $KH_2PO_4$. | 0.012% $KH_2PO_4$. |
| 0.10% $MgSO_4 \cdot 7H_2O$. | 0.10% $MgSO_4 \cdot 7H_2O$. |
| plus trace elements. | plus trace elements. |

TABLE 3 (SUBSTRATE A)

| Culture period, days | Dry weight of mycelium, g./100 ml. | Residual sugar in substrate, g./100 ml. | Fat content of mycelium, percent | N-content of mycelium, percent | Alkaloid content myc. and subs. (as ergometrine) |
|---|---|---|---|---|---|
| 10 | 0.83 | 2.8 | 6.1 | 6.7 | 0 |
| 14 | 1.78 | 0 | 4.8 | 6.2 | 0 |
| 18 | 1.32 | 0 | 2.1 | 5.4 | 0 |

TABLE 4 (SUBSTRATE B)

| Culture period, days | Dry weight of mycelium, g./100 ml. | Residual sugar in substrate, g./100 ml. | Fat content of mycelium, percent | N-content of mycelium, percent | Alkaloid content myc. and subs. (as ergometrine) |
|---|---|---|---|---|---|
| 10 | 0.41 | 4.0 | 8.2 | 6.6 | 0 |
| 14 | 0.69 | 3.1 | 11.9 | 5.7 | 0 |
| 18 | 0.86 | 2.7 | 15.4 | 4.9 | 0.8 |
| 22 | 1.08 | 1.0 | 18.7 | 4.0 | 17.6 |
| 26 | 1.13 | 0.4 | 22.2 | 3.4 | 27.2 |
| 30 | 1.09 | 0 | 20.6 | 3.4 | 14.4 |

Substantially the results obtained in submerged culture are similar to the above, but the alkaloid yields are less.

SULPHATE DEFICIENCY

In effect, the reaction of Claviceps spec. to sulphate deficiencies is similar to the change in metabolism that occurs in the case of nitrogen and phosphate deficiencies. Again, an accumulation of fats is observed in the cellular tissues in conjunction with a reduction in protein content and a diminution in cellular respiration, and this is accompanied by the synthesis of alkaloids. The limiting ratio of sulphate and carbon which is just sufficient to cover the sulphate demand of the strains that were examined was found to lie approximately between $SO_4/C = 1:200$ and 1:300. The most favourable ratio for stimulating alkaloid formation was between 1:500 and 1:1000.

Example V

The figures relating to a control culture have here been omitted since the comparative results are substantially equivalent to those obtained in nitrogen and phosphate deficiency tests. The example therefore merely gives a substrate upon which, in conditions similar to those already described in the foregoing examples, a total of 36.2 mg. percent of alkaloids (calculated on the basis of ergometrine) was obtained from surface cultures at the end of 25 days.

Substrate:
  5.00% glucose
  0.43% urea
  0.20% $KH_2PO_4$
  0.01% $MgSO_4 \cdot 7H_2O$  $SO_4/C$ approx. 1:500
  0.04% $MgCl_2$
  Plus trace elements

PRODUCTION OF ALKALOIDS IN THE PRESENCE OF RESPIRATORY TOXINS

This method is likewise based on the established fact that the respiration of Claviceps spec. must be severely inhibited if alkaloids are to be synthesised. It is a well-known fact that specific respiration inhibiting toxins can be used to reduce respiration in a large number of micro-organisms. There is already available a list of chemicals which act as toxic respiratory inhibitors and figures have also been published relating to the dosages that are required. The quantities of such toxins that should be added are of decisive importance. It is, in fact, known that far from inhibiting respiration, minor quantities of these toxins even tend to accelerate cellular respiration in micro-organisms. Investigations into the behaviour of ergot in connection with the present invention have disclosed that the reaction of ergots to respiratory toxins is substantially similar to the behaviour of moulds in like circumstances.

In accordance with the present invention it is therefore proposed to maintain Claviceps spec. in a state of reduced respiration after the completion of a preliminary period of growth by adding to the substrate known respiratory toxins such as for example cyanide, iodine acetate, arsenite, fluoride, azide, 2,4 di-nitrophenol, in the accepted quantities necessary for respiratory inhibition. Suitable concentrations of these toxins in the substrates of surface cultures are approximately $10^{-2}$ moles of cyanide, $10^{-3}$ to $5 \times 10^{-3}$ moles of iodine acetate, $10^{-2}$ moles of arsenite, $10^{-2}$ moles of fluoride, or $10^{-2}$ moles of azide. In submerged cultures, the adequate dosage is usually lower by roughly a power of ten. In this connection it was discovered that the respiration of a surface mycelium of Claviceps spec. was reduced by 79% in the presence of $10^{-2}$ moles of cyanide, whereas $10^{-3}$ moles produced only a 20% reduction. On the other hand, submerged mycelium of the same strain in otherwise equivalent conditions already experienced a reduction in respiration by 83% in the presence of only $10^{-3}$ moles of cyanide.

Example VI

A Claviceps spec. strain was isolated from a sclerotium grown on *Elymus mollis* and surface cultured at 27° C. on 100 ml. of substrate in an Erlenmeyer flask. The composition of the medium was as follows: 10.0% saccharose, 1.2% hydrolysed casein, 0.2% $KH_2PO_4$, 0.1%

$MgSO_4 \cdot 7H_2O$ 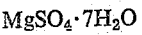

plus trace elements. The sugar had been used at the end of 20 days and the dry weight of the mycelium was then 2.93 g./100 ml. At this stage, no quantities of alkaloids worth mentioning had been formed either in the mycelium or in the substrate. An addition was then made of 0.065 g. KCN per flask, the equivalent of a concentration of $10^{-2}$ moles. The determination of the alkaloids present in the course of the next following days produced the following results:

4 days after addition 6.2 mg. total alkaloids present in the substrate and the mycelium per flask (calculated on the basis of ergometrine).
8 days after addition 14.7 mg.
12 days after addition 8.4 mg.

Rapid autolysis took place in control flasks without KCN, and no alkaloids could be traced.

COMBINATION METHOD OF ALKALOID SYNTHESIS

The methods that have been hereinabove described may, of course, be combined in various ways. Such combinations commend themselves particularly in submerged cultures of Claviceps spec. because any single one of the methods described produces a considerably smaller yield in a submerged culture than when surface cultures are used. A combined method will be hereinafter briefly explained.

Example VII

The fungus was cultured in a small fermenting tank of 5 litres capacity at 27° C. The tank was equipped with means of aeration (ceramic candles), agitator, and froth-removing equipment, pH-regulator, and sterile sampler.

Substrate:
  3.00% glucose
  0.06% urea
  0.40% hydrolised casein
  0.008% $KH_2PO_4$
  0.01% $MgSO_4 \cdot 7H_2O$
  Plus trace elements.

Culture conditions: Air induction 200 litres per litre of substrate per hour; agitator speed 400 r.p.m. Inoculation with mycelium taken from parent culture.

During the growth phase, the pH-value was maintained within the range of pH 4.8 to 5.0. At the end of 97 hours, the available sugar had been assimilated and growth completed. At this stage the mycelium contained 19.7% fat. The presence of alkaloids could not be traced either in the mycelium or in the substrate. Additions of 0.01% indole and 0.005% KCN were then made. Aeration was stopped but agitation continued. The pH-value was maintained at 5.8 to 6.0. The production of alkaloids in the substrate and in the mycelium rapidly rose and passed through an optimum in the 136th hour when the total alkaloid content in the mycelium and in the substrate (calculated on the basis of ergometrine) was determined at 0.13 g. per litre.

We claim:

1. A method of stimulating the production of ergot alkaloids which comprises cultivating saprophytically in a nutrient subtrate a fungus species of the genus Claviceps genetically able to form alkaloids, and, after a growth period at a low pH, raising the pH of the nutrient substrate and maintaining the cells of the fungus in a state of severely reduced respiration.

2. A method of stimulating the production of ergot alkaloids which comprises cultivating *Claviceps purpurea* saprophytically in a nutrient substrate and, after a growth period at a pH between 3.0 and 5.0, raising the pH of the nutrient substrate to a value between 5.5 and 7.0 and maintaining the cells of the fungus in a state of severely reduced respiration.

3. A method of stimulating the production of ergot alkaloids which comprises cultivating *Claviceps purpurea* saprophytically in a nutrient substrate and, after a growth period under aerobic conditions at a low pH, raising the pH of the nutrient substrate and maintaining the cells of the fungus under anaerobic conditions in a state of severely reduced respiration.

4. A method according to claim 3 wherein the redox potential of the substrate is adjusted to an rH value of at least 24 during the aerobic growth period and is reduced to an rH value below 18 during the anaerobic stage.

5. A method according to claim 3 wherein the anaerobic condition is obtained by the addition of a reducing agent to the nutrient substrate.

6. A method according to claim 1 wherein the substrate has a deficiency of assimilable nitrogen.

7. A method according to claim 1 wherein the substrate has a deficiency of assimilable phosphate.

8. A method according to claim 1 wherein the substrate has a deficiency of assimilable sulphate.

9. A method according to claim 1 wherein the state of reduced respiration is induced by the addition of a respiratory toxin to the substrate.

10. A method according to claim 1 wherein a substance having an indole nucleus is added to the substrate.

11. A method of stimulating the production of ergot alkaloids which comprises cultivating *Claviceps purpurea* saprophytically in a nutrient subtrate and, after a growth period under aerobic conditions at a low pH, raising the pH of the nutrient substrate and maintaining the cells of the fungus under anaerobic conditions in a state of severely reduced respiration by increasing the assimilable carbon content of the substrate.

12. A method for the production of ergot alkaloids which comprises a stage of saprophytically cultivating *Claviceps purpurea* on a nutrient substrate containing assimilable carbon, nitrogen and phosphorus under aerobic conditions at a pH between 3.0 and 5.0 to promote growth of the fungus followed by a stage of alkaloid production in which growth of the fungus is repressed by raising the pH of the substrate to between 5.5 and 7.0 and maintaining conditions of severely reduced respiration of the fungus cells.

13. A method according to claim 12 wherein the first stage is effected with a redox potential in the substrate of an rH value of at least 24 and the redox potential is adjusted to an rH value not exceeding 18 in the second stage.

14. A method of stimulating the production of ergot alkaloids which comprises cultivating saprophytically in a nutrient substrate a fungus species of the genus Claviceps genetically able to form alkaloids, and, after a growth period at a pH between 3.0 and 5.0, raising the pH of the nutrient substrate to a value between 5.5 and 7.0 and maintaining the cells of the fungus in a state of severely reduced respiration.

15. A method of stimulating the production of ergot alkaloids which comprises cultivating saprophytically in a nutrient substrate a fungus species of the genus Claviceps genetically able to form alkaloids, and, after a growth period under aerobic conditions at a low pH, raising the pH of the nutrient substrate and maintaining the cells of the fungus under anaerobic conditions in a state of severely reduced respiration.

16. A method of stimulating the production of ergot alkaloids which comprises cultivating saprophytically in a nutrient substrate a fungus species of the genus Claviceps genetically able to form alkaloids, and, after a growth period under aerobic conditions at a low pH, raising the pH of the nutrient substrate and maintaining the cells of the fungus under anaerobic conditions in a state of severely reduced respiration by increasing the assimilable carbon content of the substrate.

17. A method for the production of ergot alkaloids which comprises cultivating saprophytically a fungus species of the genus Claviceps genetically able to form alkaloids, on a nutrient substrate containing assimilable carbon, nitrogen and phosphorus under aerobic conditions at a pH between 3.0 and 5.0 to promote growth of the fungus followed by a stage of alkaloid production in which growth of the fungus is repressed by raising the pH of the substrate to between 5.5 and 7.0 and maintaining conditions of severely reduced respiration of the fungus cells.

References Cited in the file of this patent

UNITED STATES PATENTS

| | | |
|---|---|---|
| 2,056,360 | McCrea | Oct. 16, 1936 |
| 2,640,007 | Foote | May 26, 1953 |
| 2,686,754 | Monod | Aug. 17, 1954 |

OTHER REFERENCES

Wolf et al.: The Fungi, vol. 2, Wiley, 1947, pp. 354–359.

Bessey: Morphology and Taxonomy of Fungi, 1950, The Blakiston Co., p. 15.

Bisby: Taxonomy and Nomenclature of Fungi, The Commonwealth Mycological Institute, Kew, Surrey, 2nd ed., 1953, page 75.